United States Patent Office 2,884,475
Patented Apr. 28, 1959

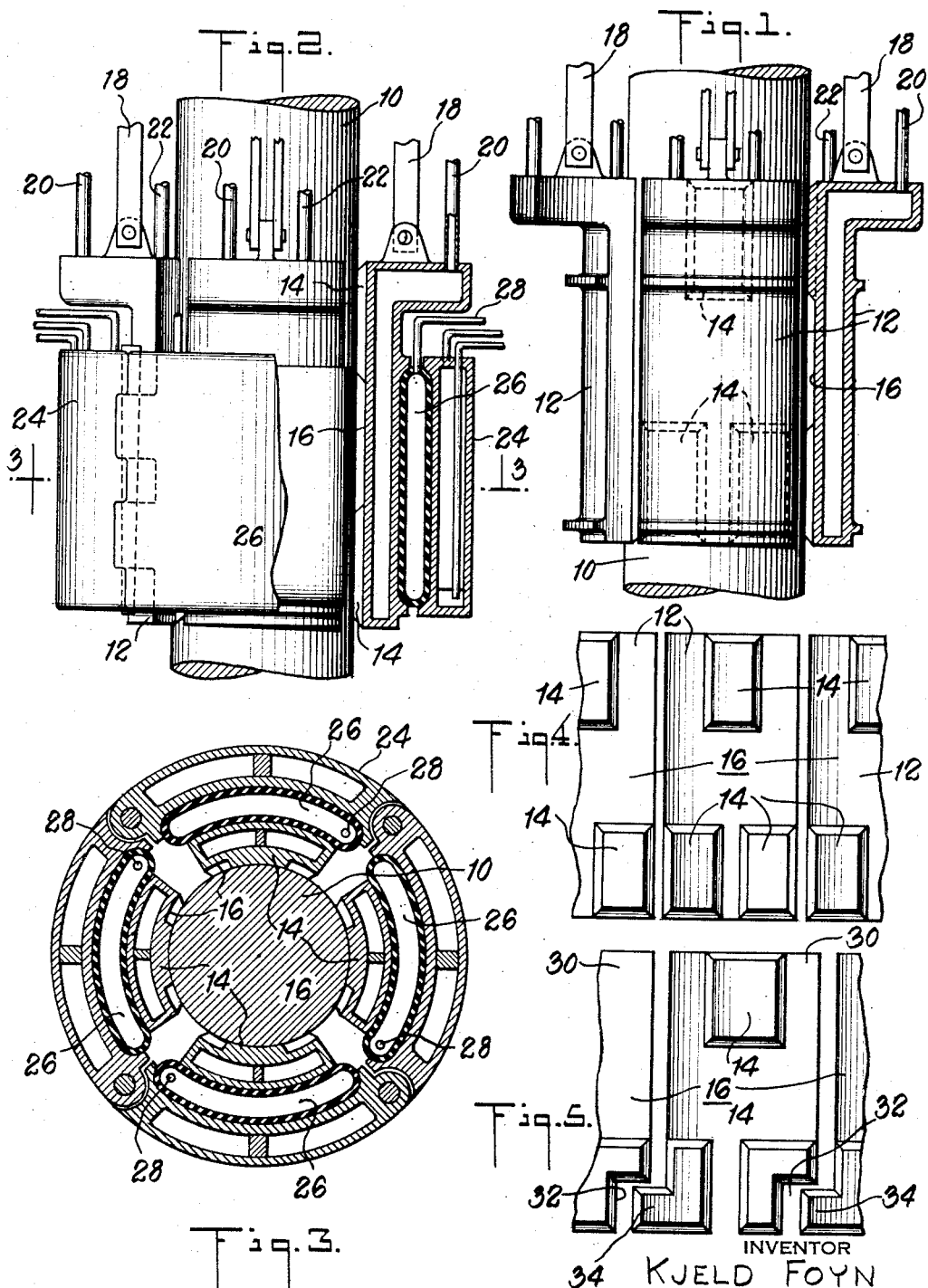

2,884,475

CLAMP MEMBERS FOR SUPPORTING ELECTRODES

Kjeld Foyn, Oslo, Norway, assignor to Elektrokemisk A/S, Oslo, Norway, a corporation of Norway Application July 12, 1957, Serial No. 671,581

4 Claims. (Cl. 13—16)

This invention relates to a holder for supporting electrodes and in particular to clamp members which have a plurality of separate clamping surfaces which enable the clamp members to maintain surface contact with the electrode even though it may change shape and have an irregular surface.

In electric furnaces such as those employed in smelting and melting operations the electrode is usually supported in a holder of the type which includes an outside ring having pressure means therein which bear against clamp members positioned around the electrode. The electrode is in effect continuous and may be either prebaked or the self-baking Soderberg type of electrode and during operation of the furnace the electrode is periodically lowered down through the holder. Heretofore this has been done by slightly relaxing the grip of the clamp members so that the electrode will slide slowly and evenly down into the furnace. Some electrode holders of this type are described in United States Patent No. 1,691,505 (now expired and in U.S. Patents Nos. 2,668,183, 2,758,145 and 2,778,865.

As shown in these patents, the inside surface of the clamp members are smooth and shaped to fit against the exterior surface of the electrode whereby clamping pressure is distributed over surface areas of the electrode and good electric contact is established between the members. But as is known, the surfaces of continuous electrodes, particularly prebaked electrodes, are not continuously smooth and even. Experience shows that because of imperfections the shape of the exterior surface of the electrode may change from one section to another and when this occurs part of the clamp member may become separated from the electrode and surface contact may be reduced to contact along a single line. Such reduction of surface contact is undesirable and it tends to increase wear on the clamp members and it also results in uneven clamping pressure and makes for poor conduction from the clamp to the electrode.

According to the present invention, an electrode holder is provided which includes a plurality of separate clamp members of special construction each of which has positioned on its inside surface a plurality of separate raised clamping surfaces preferably three in number which are positioned in triangular relationship. The three spaced separate clamping surfaces in triangular relationship on the inside of the individual clamp members provide a very firm footing against the surface of the electrode and like a tripod the clamp tends to maintain its footing on all three legs while it adjusts to changes in the shape of the electrode. At the same time each of the individual clamping surfaces because of its small size will tend to maintain greater surface contact with irregularities in the surface of the electrode than is possible with the large clamping surfaces of clamp members of ordinary construction where an irregularity in the surface of the electrode may reduce surface contact of the clamp member to contact along a single line. To make a structure of this type successful, it is absolutely essential that the clamps be held pressed against the electrode and connected together in such a way that relative movement between the clamps is possible, so that each clamp may separately assume its individual, three point contact with the electrode.

In a preferred form of structure, two clamping surfaces are positioned in the bottom portion of each clamp member so that the triangle formed by the three clamping surfaces is pointed upwardly in the direction of travel of the clamp member along the surface of the electrode. This construction enables the clamp member to better adjust to irregularities in the shape of the electrode as they come along.

Pressure for tightening the clamp members of the present invention against the electrode may be applied by any convenient known means provided the pressure means are flexible in the sense that they do not interfere with working of the individual clamp members as they adjust to change in shape of the electrodes. For this reason clamping pressure is preferably applied by means of a yielding member positioned in the outside ring of the holder or if a rigid pressure member is employed it is adapted to enable each clamp member to work individually and adjust to change in shape of that portion of the electrode with which the clamp member is in contact. Such rigid pressure members are illustrated in U.S. Patents Nos. 1,691,505 and 2,668,183. In U.S. Patent No. 1,691,505 the rigid member contacts only a limited area of the clamp member so that individual clamp members are free to adjust and conform to change in shape of the electrode. In U.S. Patent No. 2,668,183 clamping pressure is applied by means of a spring tensioned bolt which includes a ball and socket type connection so that adjacent clamp members are free to adjust independently of each other to meet changes in the shape of the electrode.

These and other advantages of the present invention may be readily understood by reference to the accompanying drawing in which:

Fig. 1 is a front elevation illustrating clamp members of the present invention in place around an electrode;

Fig. 2 illustrates one form of outside ring of an electrode holder which presses the clamp members of Fig. 1 against the electrode. The outside ring and clamp members are in section to better illustrate their construction;

Fig. 3 is a cross sectional view taken on line 3—3 of Fig. 2;

Fig. 4 shows the inside surface of the clamp members of Fig. 1 in slightly reduced scale; and Fig. 5 shows the inside surface of another form of the clamp member of Fig. 1. Fig. 5 is also slightly reduced in scale.

In the drawings, 10 is the electrode, 12 are clamp members here shown with four clamp members arranged in a ring around the electrode. Each clamp member has three separate raised clamping surfaces 14 which project out from the inside surface 16 of each clamp member to contact the exterior surface of the electrode. Clamp member 12 is bowed so that its inside surface will correspond to the shape of the electrode which is here shown to be circular in cross section. As shown in the drawing, the raised clamping surfaces are formed by means of truncated pyramids and the actual clamping surfaces 14 are also slightly curved to conform to the exterior surface of the electrode. In the preferred form of structure shown in the drawings the three raised clamping surfaces are employed in triangular relationship with two of the three clamping surfaces positioned in the lower portion of the clamp member. The triangular relationship of the clamping surfaces provides a firm footing for the clamp member against the electrode and like a tripod the three areas of contact enable the clamp member to adjust and maintain surface contact with the electrode even though it may change shape and have an irregular surface.

Clamp members 12 may be suspended from an overhead support (not shown) as by rods 18 and they are made hollow and water cooled in conventional manner by circulating water through the clamp by means of pipes 20 and 22 respectively. As is known, pipes 20 and 22 may also be employed for supplying electric current to the electrode.

Figs. 2 and 3 illustrate one convenient way in which clamping pressure may be brought to bear against the clamp members. As illustrated in the drawings, this may be done by means of an outside ring 24 made of four sections which are hinged together in a circle. The sections are hollow and are ordinarily cooled by circulating water through them. Each section carries a flexible pressure bag 26 and each pressure bag bears against a clamp member so that clamping pressure against the electrode may be controlled by regulating the pressure of fluid supplied to bag 26 through pipe 28. The outside pressure ring 24 chosen for the purpose of illustration herein was selected from United States Patent No. 2,673,227 and since the construction and operation of ring 24 is identical with that disclosed in the patent, the details of its construction will not be repeated here. Of course, any of the known electrode holder pressure rings may be employed for applying pressure to the clamp members of the present invention provided the selected pressure means are flexible in the sense that they do not interfere with working of the individual clamp members as they adjust to change in shape of the electrode. Some examples of satisfactory pressure means are disclosed in U. S. Patents Nos. 1,691,505, 2,673,227 and 2,758,145.

In the structure of my invention the clamp members provide such exceptionally good contact with the surface of the electrode that the current density flowing across from the raised clamping surfaces to the electrode was measured at 400 amperes per square inch as compared to the usual current density of only 40 amperes per square inch obtained with electrode clamp members of conventional construction.

A second form of clamp member of the present invention is shown in Fig. 5. As there shown, the clamp member 30 is identical with clamp member 12 with the single exception that each clamp member has a notch 32 cut out of one side at the bottom thereof and the second side of the clamp has a projection 34 positioned at the bottom thereof opposite the notch which is adapted to fit into the notch of an adjacent clamp member. The projections tend to keep the clamp members in the ring level and they eliminate vertical channels for passage of heat between adjacent members without interfering with the separate working of individual clamp members.

It will be understood that this invention is not to be limited to the specific construction of the clamp members, raised clamping surfaces and devices for applying clamping pressure to the clamp members disclosed herein which are used solely for the purpose of illustration. Although the invention has been described in connection with a round electrode it is obvious that different shapes and types of electrodes may be used and for example square, oblong or oval electrodes both prebaked and self-baking may be used.

It will also be understood that it is intended to cover all changes and modifications of the preferred embodiment of the invention herein chosen for the purpose of illustration which do not constitute departures from the spirit and scope of the invention.

What I claim is:

1. In a holder for an electrode of the continuous type the combination which comprises a plurality of clamp members for supporting the electrode, each of said clamp members having three separate raised clamping surfaces positioned on the inside surface thereof which bear against the electrode with two of said surfaces being spaced apart angularly in relation to the curvature of the electrode and positioned on the bottom portion of such clamp and the third of said surfaces being spaced vertically from the other two and being positioned on the upper portion of such clamp so that such surfaces form a triangular arrangement and flexible pressure means for applying pressure against the clamp members to force the raised clamping surfaces inwardly against the surface of the electrode to support it in an electric furnace, said flexible pressure means being adapted to allow the clamp members to move separately and adjust to change in shape of the surface of the electrode.

2. A structure as specified in claim 1 in which each clamp member has a notch positioned in its side and a projection positioned on the opposite side of the clamp member which extends out beyond the side of the member and is adapted to fit into the notch in an adjacent clamp member.

3. A structure as specified in claim 1 in which the flexible pressure means include a ring positioned around the clamp members having a plurality of flexible pressure bags positioned therein, each of which is adapted to apply yielding pressure against a clamp member for supporting the electrode.

4. A structure as specified in claim 1 in which each raised clamping surface is in the form of a truncated pyramid.

References Cited in the file of this patent

UNITED STATES PATENTS

| | | |
|---|---|---|
| 1,472,215 | Goughnour | Oct. 30, 1923 |
| 1,691,505 | Walter | Nov. 13, 1928 |
| 1,702,359 | Molmark | Feb. 19, 1929 |
| 2,423,714 | Leonard | July 8, 1947 |
| 2,668,183 | Foyn | Feb. 2, 1954 |
| 2,673,227 | Hubert | Mar. 23, 1954 |
| 2,753,388 | Bjerkas | July 3, 1956 |
| 2,758,145 | Bjerkas | Aug. 7, 1956 |
| 2,778,865 | Kongsgaarden | Jan. 22, 1957 |